Sept. 23, 1969  S. G. BERKLEY  3,469,062
METHOD OF JOINING METALS
Filed Jan. 3, 1968
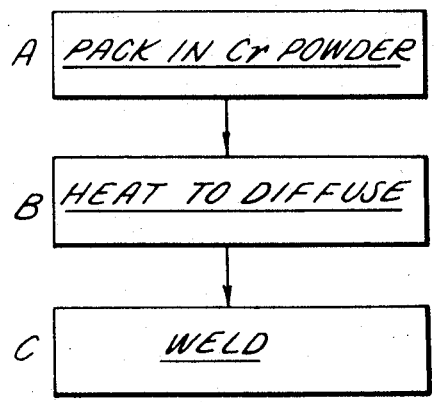
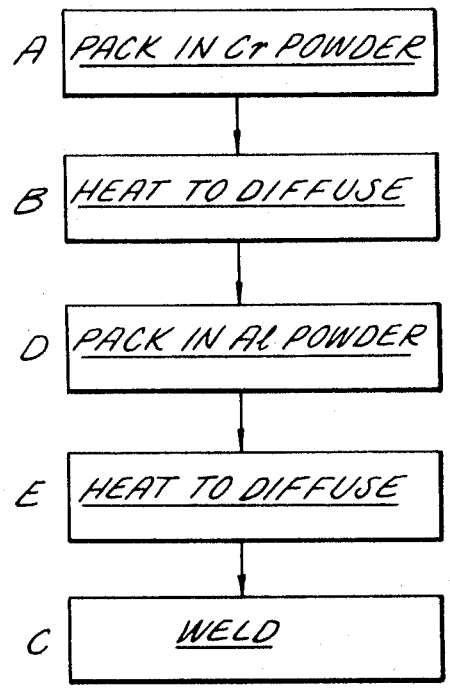
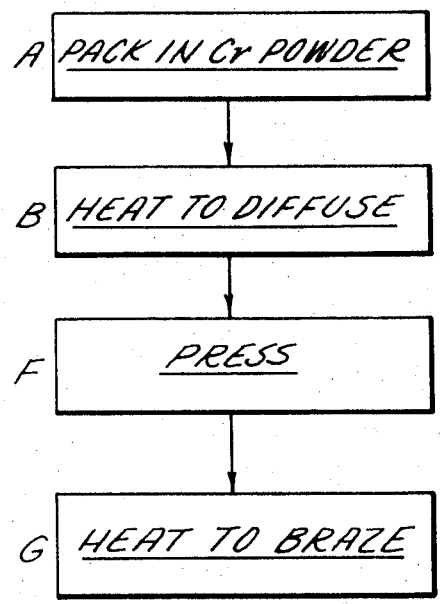
INVENTOR
STANLEY G. BERKLEY
BY Frishman + Van Kirk
ATTORNEYS United States Patent Office 3,469,062
Patented Sept. 23, 1969

3,469,062
METHOD OF JOINING METALS
Stanley G. Berkley, Colchester, Conn., assignor to United Aircraft Corporation, East Hartford, Conn., a corporation of Delaware
Filed Jan. 3, 1968, Ser. No. 695,493
Int. Cl. B23k 9/28
U.S. Cl. 219—92                                      7 Claims

ABSTRACT OF THE DISCLOSURE

A method of fusion bonding together metals which are otherwise difficult to weld or braze, most particularly dispersion strengthened metals such as oxide dispersion strengthened nickel. The metals to be joined are diffusion coated with a material to produce a coating layer having aa higher electrical resistance and/or a lower melting point than the metals to be joined. The coatings are then either resistance welded together to join the materials, or the materials are pressed together and heated whereby the coating melts and acts in the nature of a brazing compound to join the materials together.

BACKGROUND OF THE INVENTION

Field of the invention

This invention relates to the method of fusion bonding together dispersion strengthened metals which are normally difficult to join together. More particularly, this invention relates to a method of providing a coating on metals which are normally difficult to join together so that the metals produce or acquire a coating which is physically responsive to fusion bonding techniques, and thus the parts become responsive to resistance welding techniques or a modified brazing technique.

Description of the prior art

A substantial problem has heretofore been encountered in the art of joining together certain metallic parts. The problem is particularly acute in joining together parts made of an oxide dispersed phase in a pure metal matrix. Traditional resistance welding techniques are normally very difficult or impossible to apply to parts made of these relatively pure metals because of the high electrical conductivity of the pure metal, and it has been a continuing problem of increasing importance to be able to obtain strong and dependable bonds between parts made of such relatively pure metals.

SUMMARY OF THE INVENTION

In the process of the present invention, parts to be joined together are provided with a coating of a material having a higher electrical resistance and/or a lower melting point than the parts to which the coating is applied. The parts are then brought together and an electrical current is applied thereto in accordance with resistance welding techniques, and the parts are thus welded together. In a modification of the method, the coatings are employed as a modified or quasi brazing compound; the parts to be joined are pressed together and the coatings are then heated whereby they melt and joint together before melting of the parts to be joined occurs. The process of the present invention especially involves welding of dispersion strengthened metal parts, particularly oxide dispersion strengthened nickel parts.

Accordingly, one object of the present invention is to provide a novel and improved method for welding dispersion strengthened metal parts.

Another object of the present invention is to provide a novel and improved method for welding oxide dispersion strengthened pure nickel matrix parts.

Another object is to provide a novel and improved method for brazing metal parts made from the same class of dispersion strengthened metals.

Other objects and advantages will be apparent and understood from the following detailed description and drawings.

BRIEF DESCRIPTION OF THE DRAWINGS

FIGURE 1 is a flow diagram of one embodiment of a method of the present invention.
FIGURE 2 is a flow diagram of another embodiment of a method of the present invention.
FIGURE 3 is a flow diagram of yet another embodiment of a method of the present invention.

DESCRIPTION OF THE PREFERRED EMBODIMENT

In its broadest aspect, the present invention is a welding or brazing method for joining together parts of relatively pure metal by providing a coating of higher electrical resistance and/or lower melting point on the surface of the parts to be joined and then either resistance welding or brazing. Within that general concept of the present invention, the following several specific examples are presented by way of illustration. The examples will discuss the method of the present invention as applied to parts made of "TD nickel" (a Du Pont alloy consisting of 98% nickel and 2% dispersed thoria), but it will be understood that the invention is not limited to nickel and coatings therefor, but rather applies to any dispersion strengthened relatively pure metal. TD nickel and protective coatings therefor are discussed in U.S. application Ser. No. 480,029 filed Aug. 16, 1965, which is assigned to the assignee of the present application and to which reference is hereby made.

TD nickel is receiving active and serious consideration as a desirable high temperature material for burner cans and turbine vanes in aircraft gas turbine engines. However, one of the significant problems with TD nickel has been the substantial difficulty encountered in trying to either resistance weld or fusion weld it. Because of the high electrical conductivity of the TD nickel much more current must be used to achieve melting of the TD nickel and since both the nickel and copper diffuse readily in one another the copper resistance welding wheels stick to the TD nickel surface and breaks down producing a most unsatisfactory weld and surface condition.

Example 1.—The TD nickel part or parts to be welded are provided with a diffusion coating of from 0.002″–0.005″ of a deposited chromium layer diffused into the TD nickel parts to form a coating layer, a solid solution of chromium in nickel or a combination of solid solutions of chromium in nickel and a solid solution of nickel in chromium, depending on processing times and temperatures. The chromium coating may be formed in a sealed retort by packing the TD nickel parts in a mass of finely divided material composed of the chromium metal and a small amount of activator and a substantially inert filler (step A of FIGURE 1). The TD nickel parts and the mass of powder are then subjected to a diffusion heat treatment (step B of FIGURE 1), preferably in a hydrogen atmosphere, at a temperature of from 1800° F.–2550° F. or below the melting point of the alloy (2650° F.) for from fifteen minutes to seventy-two hours, preferably about two hours at 2300–2400° F. The inert filler may be omitted from the pack when the diffusion heat treatment is performed in a vacuum. The diffusion coating may also be formed on the TD nickel parts by any of the known coating or alloying processes such as vacuum vapor deposition, electroplating, dipping or spraying the parts with an aqueous slurry of the desired chromium powder so that the part acquires a coating of the powder, after which it is dried and then subjected to the same heat treatment in an inert atmosphere or a vacuum as if packed in a powder bed. An example of a coating mixture for achieving the diffusion chromium coating is as follows:

|  | Range | Preferred range | Optimum |
|---|---|---|---|
| Chromium powder (100 mesh or finer). | 2 to 98% | 150 gr. | 17.5%, 150 gr. |
| Powdered alumina ($Al_2O_3$). | 2 to 98% | 350 to 900 gr. | 81.5%, 700 gr. |
| Chromic chloride anhydrous $CrCl_3$. | 0.1 to 10% | 5 to 20 gr. | 1.5%, 10 gr. |

The diffusion coating of chromium on the TD nickel parts increases the surface resistance and lowers the melting points of the surface of the parts. The part or parts to be welded are then subjected to a standard resistance welding technique (step C of FIGURE 1) whereby resistance welding is accomplished with much greater facility and with an improved weld over that heretofore possible because of the improved welding characteristics resulting from the process of the present invention. It will be observed that the coating could also be formed by applying an adherent layer of a nickel-chromium alloy to the surface of the parts.

Example 2.—In a modified version of the process of the present invention, the part or parts to be welded are provided with a second diffusion coating of aluminum in addition to the chromium coating discussed in Example 1 to provide a duplex coating of a thin layer of nickel aluminide over an inner layer of alpha chromium or nickel-chromium alloy. After steps A and B of Example 1 are completed, the second diffusion coating of aluminum is applied by placing the part or parts to be coated in a second powder pack composed of a blended mixture of finely divided aluminum metal, or chromium and aluminum metal, or a chromium-aluminum alloy or other suitable aluminum alloy with an inert filler and an activator powder, and again subjecting the part or parts to heat treatment in an inert atmosphere, such as hydrogen, for a period of from 15 minutes to 72 hours, preferably about 2 hours, at a temperature of from 1000° F.–2500° F., preferably about 1800–2100° F. Steps D and E of FIGURE 2 show the additional packing and heat treatment steps after steps A and B have been performed and prior to the welding in step C. Once again, if the treatment is in a vacuum, the inert filler may be omitted.

The part or parts to be welded are then subjected to a standard resistance welding technique whereby a significantly improved weld is achieved over those heretofore possible because of the improved welding characteristics realized through the process of the present invention. The duplex coating of aluminum and chromium of this Example 2 is particularly desirable because it provides excellent oxidation and corrosion resistance properties as well as significantly improving the welding characteristics of the TD nickel parts.

An example of aluminum powder suitable for use in accomplishing the second coating is as follows:

|  | Range | Preferred range | Optimum gr. |
|---|---|---|---|
| Aluminum powder (100 mesh or finer). | 2 to 98% | 50 to 99% | 150 |
| Which metal powder is mixed with a mixture of— |  |  |  |
| Powdered alumina | 2 to 98% |  | 700 |
| Chromium chloride (100 mesh or finer). | 0.1 to 10% |  | 10 |

As in Example 1, the diffusion layer of chromium-aluminum is preferably applied to the part or parts to be welded by packing the part or parts in a powdered mixture of the metals as described above; but the coatings may also be formed by applying the coating to the metal part or parts to be welded in any known coating or alloying process such as vacuum vapor deposition, electroplating, dipping or spraying in the form of an aqueous slurry, which is preferably allowed to dry on the surface of the part or parts prior to heating the slurry coated part or parts to the temperature required for diffusion of the coating into the part or parts to be welded.

Example 3.—A diffusion coating of chromium is applied to two or more parts to be joined together in accordance with the diffusion coating described in Example 1. The parts to be joined are then pressed together, and the parts are then heated to a temperature approximately 100° F. less than the melting point of the base TD nickel of the parts. The diffusion coating of chromium reduces the melting point of the coated portion of a part to about 100° less than that of the base TD nickel. Thus, the heating causes the diffusion coating to melt, and the parts being pressed together are thus strongly and intimately bonded together. Steps F and G of FIGURE 3 show the pressing and heating for this method after steps A and B have been performed. The melting of the diffusion coated areas causes the diffusion coatings to act as a brazing alloy, and thus the method of Example 3 amounts to a highly efficient and effective method of brazing TD nickel parts.

In any of the bonding processes of the present invention, the coatings could be selectively applied to limited surface areas of the parts to be bonded. Each of the parts to be bonded could be provided with one or more strips, circles, squares, etc. of area upon which the desired coating or coatings is deposited and alloyed. Masking techniques could, for example, be employed to provide the selectivity. The parts to be joined together would then be brought into a contacting relationship at mutual points of coating, and the resistance welding or brazing steps would then be accomplished. The welding or brazing in accordance with the present invention may consist of welding or brazing a part upon itself or may involve the welding of one coated TD nickel part to another coated TD nickel part or one coated TD nickel part to a part dissimilar material.

While a preferred embodiment has been shown and described, various modifications and substitutions may be made without departing from the spirit and scope of this invention. Accordingly, it is to be understood that this invention has been described by way of illustration rather than limitation.

What is claimed is:
1. In the method of bonding together a part or parts of oxide dispersion strengthened nickel metal normally difficult to bond together, the steps of
 forming on the surfaces to be bonded together a coating, said coating being formed from chromium and said coating having a higher electrical resistance than the surfaces prior to coating;
 bringing together the surfaces to be bonded after coating; and
 performing a fusion bonding technique on the coated surfaces thus brought together.
2. The method of bonding as in claim 1 wherein said fusion bonding technique is resistance welding.
3. The method of bonding as in claim 1 wherein:
 said coating has a melting point less than the melting point of said surfaces prior to coating; and wherein said fusion bonding technique is a form of brazing, said coated surfaces being pressed together and being heated to a temperature above the melting point of the coating and below the melting point of the surfaces prior to coating.
4. The method of bonding as in claim 1 wherein said coating is a diffusion coating.
5. The method of bonding as in claim 1 including the step of forming a second coating on said surfaces, said second coating being formed from aluminum.
6. The method of bonding as in claim 1 including the step of forming a second coating on said surfaces, said second coating being formed from nickel-aluminum alloy.

7. The method of bonding as in claim 1 wherein the thickness of said coating is from 0.002″ to 0.005″.

References Cited

UNITED STATES PATENTS

| | | | |
|---|---|---|---|
| 1,770,540 | 7/1930 | Lunn | 219—118 |
| 2,481,626 | 9/1949 | Schryber | 219—92 |
| 3,140,382 | 7/1964 | Dijkmeijer | 219—92 |
| 3,214,564 | 10/1965 | Katzer et al. | 219—92 |

JOSEPH V. TRUHE, Primary Examiner

L. H. BENDER, Assistant Examiner

U.S. Cl. X.R.

29—492